Dec. 25, 1928.
W. H. CAPELL
1,696,521
RETRACTABLE LANDING LIGHT
Filed Feb. 3, 1928
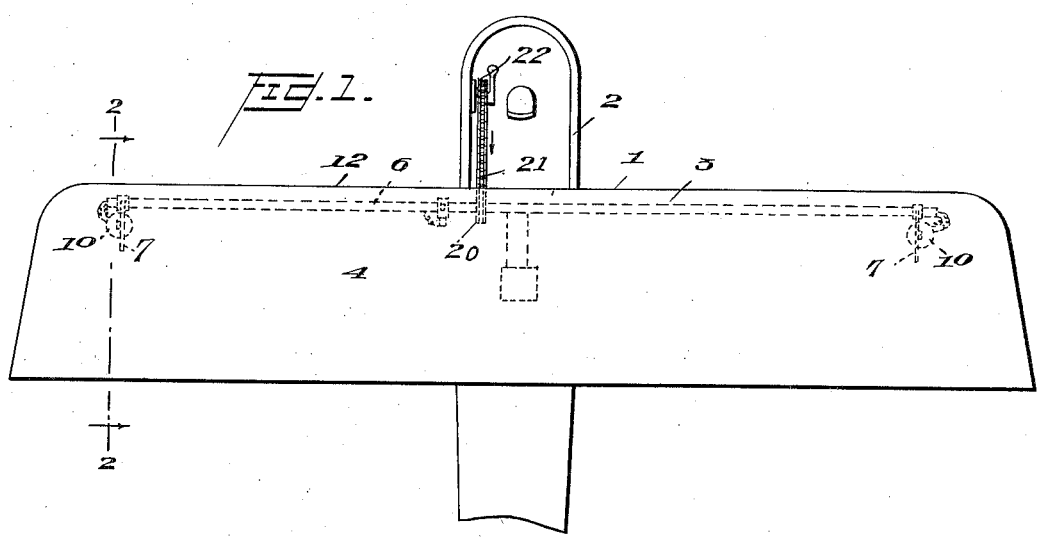
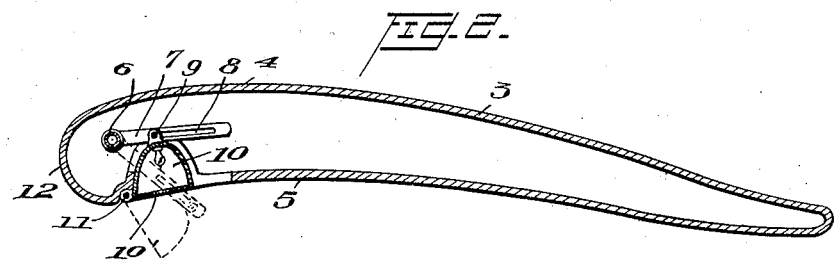
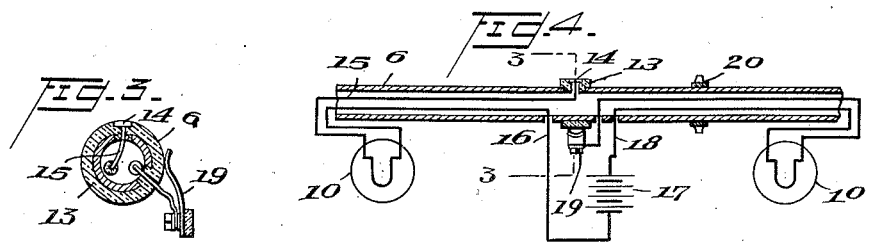
Inventor
William H. Capell
By Robert H. Young
Attorney Patented Dec. 25, 1928.

1,696,521

UNITED STATES PATENT OFFICE.

WILLIAM H. CAPELL, OF ABERDEEN, MARYLAND.

RETRACTABLE LANDING LIGHT.

Application filed February 3, 1928. Serial No. 251,617.

This invention relates to aircraft, but more particularly to a retractable landing light therefor, and has for its object to provide a device of this class wherein the light when in its retracted position conforms substantially to the surface of the aerofoil to which it is applied in such manner that the aerodynamic qualities of the aerofoil are not impaired.

A further object of the invention is to provide a retractable landing light which can be actuated into and out of its retracted position at the will of the pilot of the aircraft.

With these and other objects in view, the invention consists of the novel construction and arrangement of the devices, and in certain combinations of parts, all of which will be first fully described and afterwards specifically pointed out in the appended claims.

Referring to the accompanying drawing—

Figure 1 is a fragmentary plan view of an airplane illustrating the application of this invention thereto;

Figure 2 is an enlarged vertical transverse sectional view through the wing or aerofoil thereof taken on line 2—2 of Figure 1;

Figure 3 is an enlarged transverse sectional view taken on line 3—3 of Figure 4; and Figure 4 is a diagrammatic view of the wiring, the tubular housing being shown in horizontal section.

Like numerals of reference indicate the same parts throughout the several figures, in which;

1 indicates an airplane having a fuselage 2 and wing 3.

Longitudinally of the wing 3 and within the space defined by the upper surface 4 and the lower surface 5, is a rotatable tubular housing 6, having thereon lever arms 7, each provided with a slot 8 for engagement with a pin 9 on a lamp 10.

The lamps 10 may be of any approved form or type, but are shown in the drawing as of the usual parabolic formation and are pivoted at 11 in the lower surface 5 of the wing and preferably near the leading edge 12 thereof, so that they may be extended into normal operative position as shown in dotted lines in Figure 2 or retracted into position shown in full lines in said figure.

Arranged on the rotatable tubular housing is a fibre or other non-conducting ring 13 carrying a metallic electrical contact segment 14 connected to one of the electrical wires 15 in an electrical circuit 16 (Figure 4). The said wire leading from the said segment 14 through the tubular housing 6 to the lamp 10 and thence to an electrical battery 17, the the other wire 18 of the circuit leading from the said battery 17 through the tubular housing 6 to the other of the lamps 10 and thence through the tubular housing to a spring contact member 19 in contact with the said insulating ring 13.

While I have shown and described the foregoing construction as an embodiment of my invention, the same furnishes only an example of an application thereof.

Arranged in the tubular housing 6, is a sprocket 20 to receive a sprocket-chain 21, which leads to a sprocket actuated by a hand-lever 22 convenient to the aircraft pilot, as shown in Figure 1.

Having thus described the invention, its operation is as follows:

The lamps 10 are normally in a retracted position as shown in Figure 2, and when so positioned, the lenses 10' conform substantially to the formation of the aerofoil, as shown. Upon landing, or whenever it is desired to bring the lamps into operative position for illumination, the hand-lever 22 is retracted in the direction of the arrow shown in Figure 1. This movement is communicated to the tubular housing 6 and rotates the same so that the segment 14 in the insulating ring 13 is moved from position shown in Figure 3, under and in electrical contact with the spring contact or brush 19. This operation closes the electrical circuit and simultaneously moves the retracted lamps 10 into operative position shown in dotted lines in Figure 2. The result is that upon retraction of the lamps 10 the electrical circuit is broken, while the circuit is closed to light the lamps when the lamps are moved into operative position, and remains closed as long as the lamps are in their extended operative position.

Having thus described the invention, I do not wish to be understood as limiting myself to the construction and arrangement of parts as herein set forth, but consider myself clearly entitled to all such changes and modifications as fall within the limit and scope of the appended claims.

What I claim as new and desire to secure by Letters Patent of the United States is:

1. A device of the character described including a lamp pivotally mounted in an aerofoil of an aircraft near the leading edge thereof in such manner that the lens thereof is substantially in continuation of the under surface of the aerofoil, a rotatable tubular housing lying longitudinally of the aerofoil and within the space defined by the upper and lower surfaces thereof, means for connecting said housing with the said lamp to extend the lamp out of retracted position, an electrical circuit in which the said lamp is included, an insulating ring on the said tubular housing, an electrical contact segment on said ring located in said circuit, a brush arranged in the path of rotation of the said segment, and located in said circuit, and manually operating means for rotating the said housing to extend the lamp into operative position, and to move the said segment into electrical contact with the said brush to close the electrical circuit.

2. A device of the character described including a lamp arranged in an electrical circuit and pivotally mounted in an aerofoil of an aircraft in such manner that the lens thereof is substantially in continuation of the under surface of the aerofoil, manually operating means for extending said lamp out of its retracted position, an electrical circuit, means for closing said electrical circuit, and means for connecting the circuit closing means with said means for extending the lamp out of its retracted position, whereby upon extension of the lamp out of its retracted position, the electrical circuit is closed.

3. A device of the character described including a lamp arranged in an electrical circuit and pivotally mounted in an aerofoil of an aircraft in such manner that the lens thereof is substantially in continuation of the under surface of the aerofoil, manually operating means for extending said lamp out of its retracted position, an electrical circuit, and means for closing said electrical circuit.

4. A device of the character described, including a lamp arranged in an electrical circuit, means for mounting the same in an aerofoil of an aircraft in such manner that the lens thereof is substantially in continuation of the lower surface of the aerofoil, manually operating means for extending said lamp out of its retracted position, an electrical circuit and means for closing said electrical circuit.

5. A device of the character described including a lamp, means for mounting the same in an aerofoil of an aircraft in such manner that the lens thereof is in substantial continuation of the lower surface of the areofoil, and means for extending the lamp out of its retracted position.

In testimony whereof I affix my signature.

WILLIAM H. CAPELL.